United States Patent Office 2,965,591
Patented Dec. 20, 1960

2,965,591

VINYL CHLORIDE RESINS PLASTICIZED WITH AMIDES

Joachim Dazzi, Dayton, Ohio, assignor to Monsanto Chemical Company, St. Louis, Mo., a corporation of Delaware No Drawing. Original application Mar. 4, 1955, Ser. No. 492,299, now Patent No. 2,875,218, dated Feb. 24, 1959. Divided and this application Aug. 4, 1958, Ser. No. 753,084

4 Claims. (Cl. 260—23)

The present invention relates to new cyclic amides, and more particularly provides new and valuable amides of certain dimeric, unsaturated vegetable oil fatty acids and vinyl chloride polymers plasticized with said amides.

Dimeric fatty acids employed for the preparation of the present amides may be obtained by heating esters of polyunsaturated acids such as linoleic or linolenic acid at high temperatures substantially as described by Bradley and Johnson (Ind. Chem. 32 802 (1940); 33 86 (1941)). The dimeric acids may also be those prepared by dehyrating a hydroxylated higher fatty acid or an ester thereof, e.g., ricinoleic acid or castor oil, to yield a dienic, dicarboxy compound, e.g., such as that described in the U.S. Patent No. 2,325,040, to Cook et al. and No. 2,347,562, to Johnston. They are dicarboxy cyclic compounds, one mole of the poly-olefinic fatty acid having added to another mole of said acid at an olefinic bond thereof by a cross-linking reaction to give the cyclic structure.

According to the invention, the dimeric fatty acids are reacted with dialkylamines to give new and valuable N,N,N',N'-tetraalkyl diamides. The dimeric acids which I employ for the preparation of the new diamides are the dimers of a poly-olefinic acid or a hydroxylated olefinic acid of from 10 to 24 carbon atoms, e.g., the dimers of linoleic, linolenic, elaeostearic acid, or ricinoleic acid. The dialkylamines which are reacted with the dimeric acids have from 1 to 8 carbon atoms in the alkyl radical, e.g., dimethylamine, diethylamine, ethylmethylamine, di-isopropylamine, di-n-butylamine, di-n-amylamine, n-amylpropylamine, di-n-hexylamine, di-n-heptylamine, bis(2-ethylhexyl)-amine, isoamyl-n-octylamine, etc. Although in prior art reactions effected with the dimeric acids generally led to high molecular weight compounds (see, e.g., U.S. Patent No. 2,429,219, to Cowan wherein superpolyesters are formed with hydroxy compounds and U.S. Patent No. 2,630,441, to Dazzi wherein polycarboxylates are formed with alkyl fumarates), in the present instance the compounds are simple diamides, the reaction product of, say, linoleic acid dimer and a dialkylamine having the probable formula

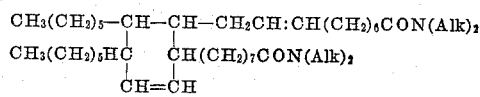

in which Alk denotes an alkyl radical of from 1 to 8 carbon atoms.

When working with the low molecular weight, readily volatile dialkylamines, it is preferred to pass the amine gradually into the heated (150° C.–300° C.) dimeric acid while removing water which is formed in the condensation reaction. Completion of the reaction is ascertained by noting the quantity of water collected. Because the condensation occurs very readily, generally by the time that the stoichiometric quantity of the lower, volatile amine has been passed into heated dimeric acid, the reaction is completed. When working with the higher amines, a mixture of the dimeric acid and the amine is maintained at an elevated temperature, say, at a temperature of from 150° C. to 300° C. until conversion of the acid to the diamide has occurred. A heating time of only a few minutes to several hours is generally sufficient. When liberation of water has ceased, the diamide may be separated from the reaction mixture by distillation or by fractional crystallization. When operating with stoichiometric quantities in the absence of diluents or catalysts and removing the reaction water as it is formed, the crude reaction product may generally be employed as such for many purposes.

While the use of an inert diluent or solvent in the condensation reaction is sometimes advantageous, particularly when working with large quantities of reactants and/or employing the higher dialkylamines, such a practice generally is time-consuming in that not only a longer heating time is required, but also there is necessitated a separating step. Inert solvents or diluents which may be employed include the high-boiling aliphatic hydrocarbons such as kerosene.

Since condensation of the dimeric acid with the dialkylamine occurs very readily, acceleration of the reaction by catalytic means is usually unnecessary. Catalysts which may be employed are acidic or basic materials known to catalyze dehydrating condensations, e.g., sulfuric acid, 4-toluenesulfonic acid, sodium methoxide, etc.

The present N,N,N',N'-tetraalkyl diamides of the dimeric acids are generally clear and transparent, stable high-boiling materials which may be used for a variety of industrial purposes but which I have found to be particularly valuable as plasticizers for vinyl chloride polymers. The present diamides are generally useful plasticizers for polyvinyl chloride and copolymers of at least 70 percent by weight of vinyl chloride and up to 30 percent by weight of an unsaturated monomer copolymerizable therewith, for example, vinyl acetate, vinylidene chloride, etc.

The present diamides are compatible with vinyl chloride polymers and show no exudation of plasticizer even at a plasticizer content of up to 50 percent. Although the quantity of plasticizer will depend upon the particular polymer to be plasticized and upon its molecular weight, it is generally found that compositions having within the range of from 5 percent to 50 percent by weight of plasticizer will, in most instances, be satisfactory for general utility. The good flexibility of the plasticized compositions increases with increasing plasticizer concentration.

The invention is further illustrated, but not limited, by the following examples:

*Example 1*

Excess dimethylamine was passed for 4.5 hours through 564 g. (1.0 mole) of linoleic acid dimer while maintaining the reaction temperature at about 200° C. and collecting 50 ml. of reaction water saturated with dimethylamine. The reaction mixture thus obtained was flushed with nitrogen to remove unreacted amine. The residue comprised the substantially pure N,N,N',N'-tetramethyldiamide of dimeric linoleic acid, analyzing 4.42 percent nitrogen as against 4.52 percent, the calculated nitrogen content of said diamide.

Similar treatment of ricinoleic acid dimer with dimethylamine yielded the N,N,N',N'-tetramethyldiamide of dimeric ricinoleic acid. Replacing the dimethylamine with di-n-butylamine and heating batchwise with linoleic acid dimer at 215° C. gives the N,N,N',N'-tetra-n-butyldiamide of dimeric linoleic acid.

*Example 2*

The free acid content of the N,N,N',N'-tetramethyldiamide of dimeric linoleic acid of Example 1 was reduced by treatment with alcoholic potassium hydroxide. The purified diamide was then evaluated as a plasticizer for polyvinyl chloride by the following procedure:

Sixty parts by weight of polyvinyl chloride and 40 parts by weight of the purified diamide were mixed on a rolling mill to a homogeneous blend. During the milling there was observed substantially no fuming or discoloration. A molded sheet of the mixture was clear and transparent and substantially colorless. Testing of the molded sheet for low temperature flexibility by the Clash-Berg method gave a value of minus 17.2° C. Testing of the volatility characteristics of the plasticized composition by a modified carbon absorption test procedure of the Society of Plastics Industry gave a volatility value of 0.8 percent, which value shows very good temperature stability of the plasticizer composition. A sample of the plasticizer composition which had been immersed in distilled water for 24 hours showed a solids loss of 1.05 percent, and immersion of a disc of the plasticized composition in kerosene for 24 hours gave a solids loss value of 0.9 percent, which value indicates very good kerosene resistance.

Instead of the N,N,N',N'-tetramethylamide of linoleic acid dimer, other tetraalkyl diamides of said dimer or of other dimeric higher unsaturated acids give similarly valuable plasticized polyvinyl chloride compositions. Thus, by employing 40 parts by weight of the N,N,N',N'-tetraisopropyldiamide of dimeric linolenic acid or the N,N'-diethyl-N,N'-di-n-amyldiamide of ricinoleic acid dimer with 60 parts by weight of polyvinyl chloride or with 60 parts by weight of a vinyl chloride-vinyl acetate copolymer known to the trade as "Vinylite," there are obtained clear, colorless compositions of very good flexibility and stability.

While the above example shows only a composition in which the ratio of plasticizer to polymer content is 40:60, the content of diamide to polyvinyl chloride may be widely varied, depending upon the properties desired in the final product. For many purposes, a plasticizer content of, say, from only 10 percent to 20 percent is preferred.

Although the invention has been described particularly with reference to the use of the present diamides as plasticizers for polyvinyl chloride, these diamides are advantageously employed also as plasticizers for copolymers of vinyl chloride, for example, the copolymers of vinyl chloride with vinyl fluoride, vinylidene chlorofluoride, vinylidene chloride, methyl methacrylate, acrylonitrile, etc. Preferably, such copolymers have a high vinyl chloride content, i.e., a vinyl chloride content of at least 70 percent of vinyl chloride and up to 30 percent by weight of a copolymerizable monomer.

The plasticized polyvinyl halide compositions of the present invention have good thermal stability; however, for many purposes it may be advantageous to use known stabilizers in the plasticized compositions. Also, while the present diamides are of general utility in softening vinyl chloride polymers, they may be used as the only plasticizing component in a compounded vinyl chloride polymer, or they may be used in conjunction with other plasticizers.

This application is a division of my copending application, Serial No. 492,299, filed March 4, 1955, and now U.S. Patent No. 2,875,218.

What I claim is:
1. A resinous composition comprising a vinyl chloride polymer containing at least 70% by weight of vinyl chloride plasticized with an N,N,N',N'-tetraalkyl diamide of a dimer of an acid selected from the class consisting of polyolefinic acids and hydroxylated olefinic fatty acids of from 10 to 24 carbon atoms, said tetraalkyl diamide having from 1 to 8 carbon atoms in the alkyl radical.
2. A resinous composition comprising polyvinyl chloride plasticized with an N,N,N',N'-tetraalkyl diamide of a dimer of an acid selected from the class consisting of polyolefinic acids and hydroxylated olefinic fatty acids of from 10 to 24 carbon atoms, said tetraalkyl diamide having from 1 to 8 carbon atoms in the alkyl radical.
3. A resinous composition comprising polyvinyl chloride plasticized with an N,N,N',N'-tetraalkyl diamide of dimeric linoleic acid having from 1 to 8 carbon atoms in the alkyl radical.
4. A resinous composition comprising polyvinyl chloride plasticized with the N,N,N',N'-tetramethyldiamide of dimeric linoleic acid.

No references cited.